(12) United States Patent
Bertola et al.

(10) Patent No.: US 11,453,239 B2
(45) Date of Patent: Sep. 27, 2022

(54) SENSORIZED SUSPENSION ASSEMBLY FOR VEHICLES, INCLUDING A WHEEL HUB UNIT AND A SUSPENSION UPRIGHT OR KNUCKLE, AND AN ASSOCIATED METHOD AND WHEEL HUB UNIT

(71) Applicant: Aktiebolaget SKF, Gothenburg (SE)

(72) Inventors: Maurizio Bertola, Turin (IT); Marco Cambiano, Cumiana (IT); Igor Dorrestijn, Woerden (NL); Alessandro Galeazzi, Piscina (IT); Carmelo Gulli, Turin (IT)

(73) Assignee: AKTIEBOLAGET SKF

( * ) Notice: Subject to any disclaimer, the term of this patent is extended or adjusted under 35 U.S.C. 154(b) by 11 days.

(21) Appl. No.: 17/113,761

(22) Filed: Dec. 7, 2020

(65) Prior Publication Data
US 2021/0170789 A1 Jun. 10, 2021

(30) Foreign Application Priority Data

Dec. 9, 2019 (IT) .................. 102019000023355

(51) Int. Cl.
*B60B 27/00* (2006.01)
*F16C 41/00* (2006.01)
(Continued)

(52) U.S. Cl.
CPC ...... *B60B 27/0068* (2013.01); *B60B 27/0078* (2013.01); *F16C 19/522* (2013.01);
(Continued)

(58) Field of Classification Search
CPC .... F16C 19/184; F16C 19/186; F16C 19/522; F16C 33/586; F16C 41/00; F16C 2233/00;
(Continued)

(56) References Cited

U.S. PATENT DOCUMENTS 4,203,319 A * 5/1980 Lechler ................. G01L 5/0019
73/862.541
6,619,102 B2 9/2003 Salou et al.
(Continued)

FOREIGN PATENT DOCUMENTS

DE 7106270 5/1971
DE 102012200773 7/2013
(Continued)

OTHER PUBLICATIONS

International Search Report for corresponding Italy Patent Application No. 102019000023355 dated Jul. 16, 2020.
(Continued)

*Primary Examiner* — Alan B Waits
(74) *Attorney, Agent, or Firm* — Reed Smith LLP (57) ABSTRACT

In a vehicle suspension assembly a sensorized system applied to a wheel hub unit, in which radially outer cylindrical surface of an outer ring of the wheel hub unit configured for coupling to a suspension upright or knuckle has four circumferential flats formed to be angularly spaced from each other on the radially outer lateral cylindrical surface, each flat delimiting a plane surface which extends axially over a pair of annular tracks for rolling bodies of the outer ring; each flat carries integrally a sensor module including a pair of extensometers positioned parallel to each other and each at the position of a respective annular track, orientated in a circumferential direction so as to extend along a circumferential development of the annular track; an electrical circuit picks up a signal from each sensor module and sends it to a data socket carried by the suspension upright or knuckle.

16 Claims, 5 Drawing Sheets

(51) Int. Cl.
*G01L 5/00* (2006.01)
*F16C 19/52* (2006.01)
*F16C 33/58* (2006.01)
*F16C 19/18* (2006.01)

(52) U.S. Cl.
CPC ............. *F16C 33/586* (2013.01); *F16C 41/00* (2013.01); *G01L 5/0019* (2013.01); *B60G 2204/115* (2013.01); *B60G 2206/50* (2013.01); *F16C 19/184* (2013.01); *F16C 2233/00* (2013.01); *F16C 2326/02* (2013.01)

(58) Field of Classification Search
CPC ............. F16C 2326/02; B60B 27/0078; B60B 27/0068; B60G 2204/115; B60G 2206/50; G01L 5/0019
See application file for complete search history.

(56) References Cited

U.S. PATENT DOCUMENTS

| | | | |
|---|---|---|---|
| 6,658,943 | B2 | 12/2003 | McDearmon |
| 6,687,623 | B2 | 2/2004 | Bailey et al. |
| 6,873,925 | B2 | 3/2005 | Salou et al. |
| 7,631,553 | B2 | 12/2009 | Heim et al. |
| 9,453,780 | B2 | 9/2016 | Erskine et al. |
| 2009/0283557 | A1 | 11/2009 | Maginess |
| 2010/0262383 | A1* | 10/2010 | Isobe .................. G01L 5/0019 702/42 |
| 2011/0209562 | A1* | 9/2011 | Ono .................. B60B 27/0005 73/862.045 |
| 2011/0214513 | A1* | 9/2011 | Ikki .................. B60B 27/0068 73/862.045 |
| 2014/0086517 | A1* | 3/2014 | Norimatsu .......... B60B 27/0005 384/448 |
| 2014/0212081 | A1* | 7/2014 | Takahashi ............. G01L 5/0019 384/448 |
| 2015/0177099 | A1 | 6/2015 | Hamilton et al. |
| 2015/0219525 | A1 | 8/2015 | Hamilton et al. |
| 2015/0267742 | A1* | 9/2015 | Hatakeyama ....... B60B 27/0005 384/448 |
| 2016/0334290 | A1 | 11/2016 | Mol et al. |

FOREIGN PATENT DOCUMENTS

| | | |
|---|---|---|
| EP | 432122 | 12/1991 |
| EP | 1058106 | 12/2000 |
| EP | 1176324 | 1/2002 |
| EP | 1361421 | 11/2003 |
| EP | 1930708 | 11/2008 |
| EP | 2006652 | 12/2008 |
| EP | 2841904 | 10/2013 |
| EP | 2999894 | 3/2016 |
| FR | 2812355 | 2/2002 |
| GB | 1378685 | 12/1974 |
| GB | 2542565 | 3/2017 |
| JP | 2014071085 | 4/2014 |
| NL | 1016756 | 5/2002 |
| NL | 1017977 | 11/2002 |
| NL | 1023948 | 1/2005 |
| NL | 1024372 | 3/2005 |
| WO | 2009092390 | 7/2009 |
| WO | 2012076024 | 6/2012 |
| WO | 2012168757 | 12/2012 |
| WO | 2013160053 | 10/2013 |
| WO | 2014195483 | 12/2014 |

OTHER PUBLICATIONS

Patent No. 695,096 "BROILER", J. P. Faivre, Issued Mar. 11, 1902.

* cited by examiner

SENSORIZED SUSPENSION ASSEMBLY FOR VEHICLES, INCLUDING A WHEEL HUB UNIT AND A SUSPENSION UPRIGHT OR KNUCKLE, AND AN ASSOCIATED METHOD AND WHEEL HUB UNIT

CROSS REFERENCE OF RELATED APPLICATION

This application is based on and claims priority to Italian Application No. 102019000023355, filed Dec. 9, 2019, under 35 U.S.C. § 119, the entire contents of which are incorporated herein by reference.

TECHNICAL FIELD

The present disclosure relates to a suspension assembly for vehicles comprising a wheel hub unit and a suspension upright or knuckle.

PRIOR ART

In suspension assemblies in use at the present time, use is only made of sensors that are capable of detecting the rotation speed of each wheel of a vehicle, whereas no use is made of sensorized suspension assemblies capable of detecting the stresses which the tire receives from the road while running, and which in turn transmits to the wheel hub unit on which the vehicle wheel is mounted.

U.S. Pat. No. 6,619,102B2 describes a wheel hub unit consisting of a rolling bearing, an outer ring of which has a flange for fixing to the suspension upright, and is provided with circumferential and radial elastic deformation areas, to each of which a single strain sensor is fitted. This solution is complex and costly to implement, and has not proved effective in correctly detecting the forces acting on the tire.

U.S. Pat. No. 6,658,943B2 describes a rolling bearing with a double row of tapered rollers, in which the radially outer lateral cylindrical surface of the outer ring of the bearing is provided with four sensor modules fixed circumferentially to the cylindrical surface and angularly spaced from each other. Each module consists of a pair of strain sensors positioned at 90° to each other. However, this solution has also failed to prove effective in correctly detecting the forces acting on the tire, and requires the use of relatively complex sensor modules.

DESCRIPTION OF THE DRAWINGS

The invention will now be described with reference to the attached drawings, which show a non-limiting example of its embodiment, in which.

DETAILED DESCRIPTION

A suspension assembly for vehicles in accordance with this disclosure includes a wheel hub unit and a suspension upright or knuckle and a sensorized system for detecting in real time the forces and moments applied to the tire of each wheel. The sensorized system supplies this information to the control unit of the vehicle to improve stability control and make it more effective.

Figure 1:
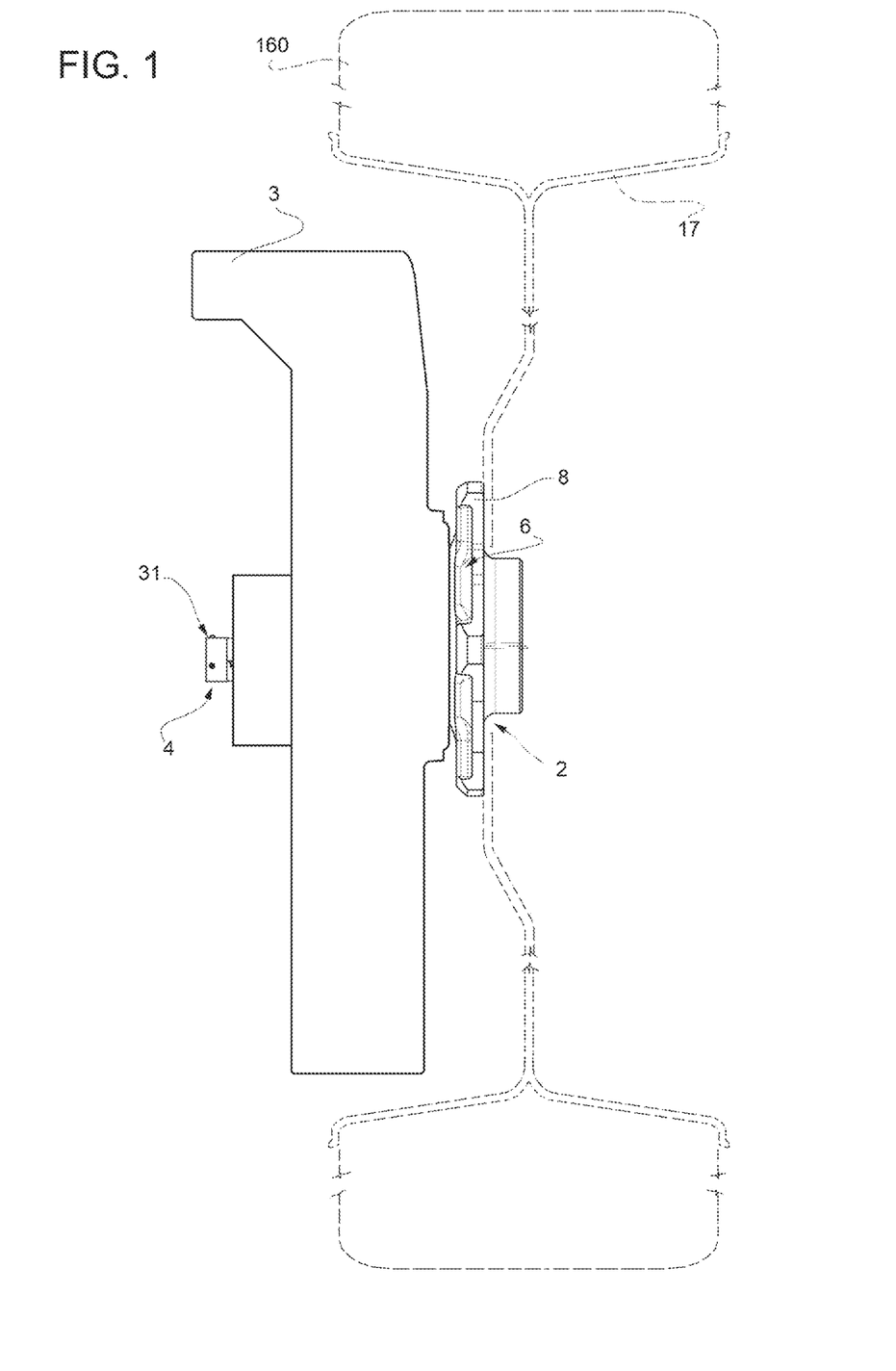
FIGS. 1 and 2 show schematically two orthogonal views, in side and rear or "inboard" elevation respectively, of a sensorized suspension assembly of a vehicle according to the invention.
Figure 4:
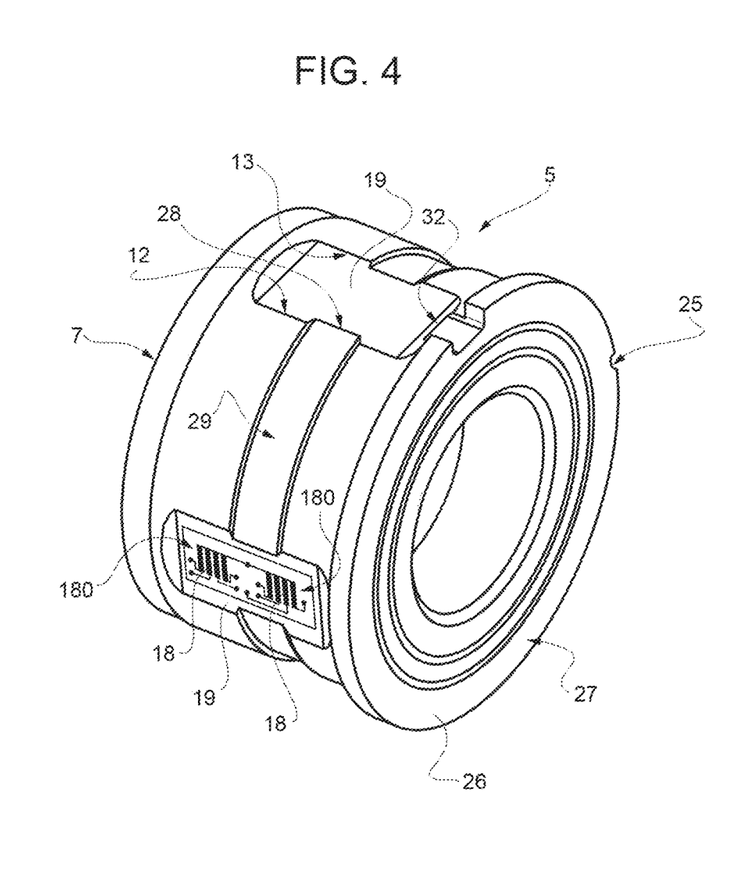
FIG. 4 shows schematically an enlarged rear three-quarter perspective view of a radially outer ring of a wheel hub unit forming part of the suspension assembly of FIGS. 1 and 2.

With reference to FIGS. 1 and 4, in these figures the number 1 indicates the whole of a vehicle suspension assembly, comprising a wheel hub unit 2, a suspension upright or knuckle 3 for the wheel hub unit 2, and a sensorized system 4 generally configured for detecting mechanical stresses acting on the wheel hub unit 2.

A wheel hub unit 2 comprises a rolling bearing 34 which in turn comprises a radially outer ring 5 and a radially inner ring 35, an annular flanged hub 6 inserted coaxially radially on the inside of the radially outer ring 5 and coupled angularly and integrally to the inner ring 35, and a plurality of rolling bodies 9 (FIG. 3) inserted between the outer ring 5 and the flanged hub 6, in the present case between the outer ring 5 and the inner ring 35, to make the flanged hub 6 rotatable with respect to the outer ring 5 which is stationary in use since it is attached/fixed to the suspension upright or knuckle 3.

A flanged hub 6 is inserted into the radially outer ring 5 of a rolling bearing 34 from the side of a first end 7 (FIG. 3) of the outer ring 5 facing, in use, towards a outside of the vehicle, and, in the illustrated example, towards a flange 8 of the hub 6 that extends radially and projectingly on the outside of the hub 6.

In the illustrated non-limiting example, the rolling bodies 9 consist of two rows of balls.

In all cases, rolling bodies 9 are configured for engaging two respective annular rolling tracks 10 formed on a radially inner lateral surface 11 of the outer ring 5 (FIG. 3), which is substantially cylindrical in the illustrated example.

Rolling bodies 9 also engage, in a known way, with corresponding annular rolling tracks, known but not described for simplicity, formed radially on the outside of the inner ring 35, or, in the absence of the latter, directly on the hub 6.

Figure 5:
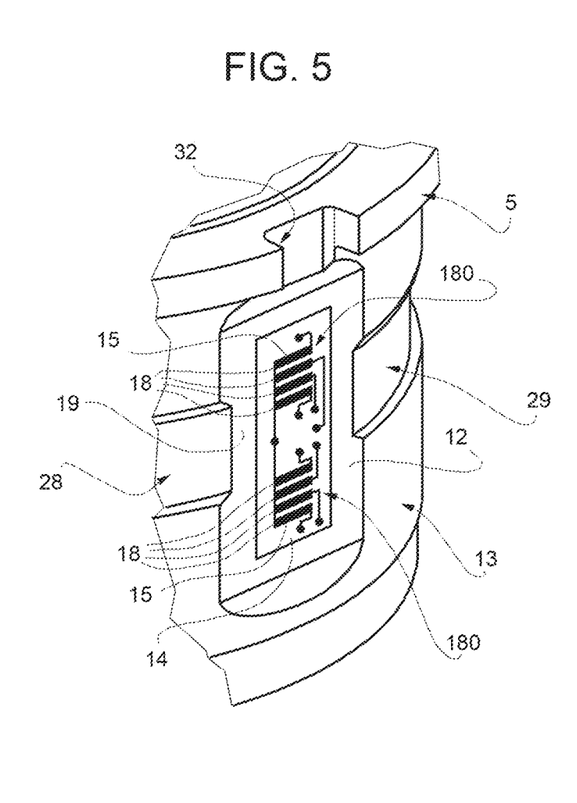
FIG. 5 shows schematically a perspective view of the outer ring of FIG. 4 sensorized according to the invention.
Figure 6:
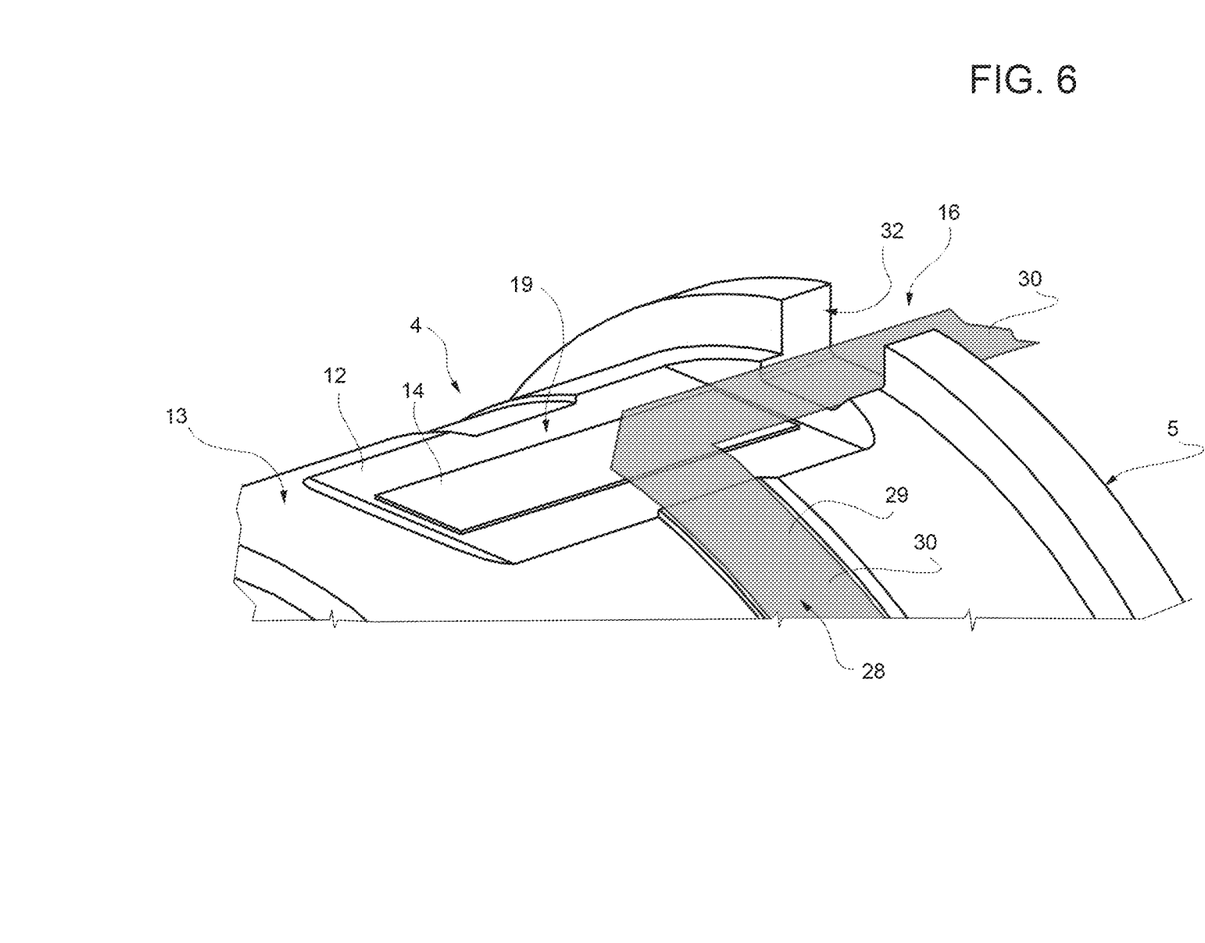
FIG. 6 shows schematically, on a further enlarged scale, a detail of the outer ring of FIG. 4 sensorized according to the invention.

According to an aspect of the invention, a sensorized system 4 comprises (FIG. 4) four flats 12 (only two of which are visible in the figures) formed (FIGS. 5 and 6) to be angularly spaced from each other on a radially outer lateral cylindrical surface 13 of the outer ring 5 of the wheel hub unit 2.

Each flat 12 extends axially over at least one of the annular rolling tracks 10 for the rolling bodies 9, and on both tracks 10 in a preferred example of embodiment illustrated.

Each flat 12 is also orientated in a circumferential direction transversely to an axis of symmetry A of the radially outer lateral cylindrical surface 13 of the outer ring 5.

The sensorized system 4 further comprises a strain sensor module 14 (FIGS. 5 and 6) fixed integrally to each flat 12.

Each sensor module 14 includes, in turn, according to a further aspect of various embodiments, a strain sensor 15 of a known type, for example a strain gauge or extensometer, placed at the position of each respective annular rolling track 10 for the rolling bodies 9 and orientated, according to a further aspect of the invention, in a circumferential direction so as to extend along a circumferential development of the annular track 10 at the position of which it is placed.

Finally, the sensorized system 4 comprises an electrical circuit 16 (FIGS. 3 and 5) for picking up an electrical signal transmitted by, or simply relating to, each sensor module 14.

In the preferred example of embodiment illustrated, as stated above, the radially outer ring 5 of the wheel hub unit 2 has a pair of rolling tracks 10 for the rolling bodies 9, positioned axially in tandem.

Additionally, each sensor module 14 consists of a pair of known strain sensors 15, positioned parallel to each other and fixed to respective portions 180 (FIG. 4) of each flat 12, these portions being placed in an axial position substantially identical to that of the tracks 10 of the aforesaid pair of rolling tracks for the rolling bodies 9.

In particular, as is well known to those skilled in the art, in rolling bearings, particularly in those with two rows of balls as illustrated in a non-limiting way, theoretical lines of contact are present/are defined, these lines, for each row of rolling bodies, intercepting the outer lateral surface of the bearing, in this case the radially outer lateral cylindrical surface 13 of the outer ring 5.

According to an aspect of the invention, the flats 12 are formed on the surface 13 in such a way that these theoretical lines of contact intercept the surface 13 exactly at the position of each of the flats 12 and, especially, at respective points defined at the design stage which must correspond, according to a further aspect of the invention, to the angular and axial positions in which the sensors or extensometers 15 are placed, corresponding to the portions 180 in the present case.

Thus the strain sensors or extensometers 15 measure the load components in a tangential direction only, and the benefit of this positioning is that they read along the lines of action of the loads that the rolling bodies exchange with the rolling tracks.

Therefore the position of the strain sensors 15 on the flats 12 is not selected at random, but is defined, in accordance with this disclosure, both on the side which is on the inside of the vehicle or inboard and on the side which is on the outside of the vehicle or outboard, by the intersection of the line/strip of the (working) angle of contact of the individual tracks 10 of the rolling bearing 34 with a surface 19 delimiting the flats 12 themselves.

Because of this specific relative arrangement of the flats 12, the tracks 10 and the sensors 15, the sensorized system 4 has surprisingly proved to be capable of detecting in real time, when the wheel hub unit 2 is in use on a vehicle, forces and moments applied to a tire 160 of a wheel 17 mounted on the wheel hub unit 2 (FIG. 1).

According to the illustrated non-limiting example, the sensors 15 (FIG. 6) consist of extensometers formed by a plurality of arms 18 made of a known piezoresistive material that is capable of varying its electrical resistance in response to even very small variations in the length of the arms 18. Evidently, other types of strain sensor are applicable to the invention: for example, the material of the arms 18 may be a piezoelectric material capable of emitting an electrical signal auto-generated by the piezoelectric effect as a result of deformations, or the sensors 15 could be of the capacitive type or of any other kind that is capable of precisely detecting every (elastic) deformation of the flats 12 due to the forces exchanged with the rolling bodies 9 as a result of the stresses received by the tire 160 in use.

According to a preferred aspect of the invention, the modules 14 are fixed to the flats 12 by gluing. In particular, the sensor modules 14 consist of a sheet of flexible plastic material, such as Mylar®, bearing the arms 18 applied to one of its faces, these arms possibly being, for example, screen printed on the Mylar® sheet, and the sheet being glued on to a respective flat 12 in close contact with it. On the other hand, the sensors 15 could be directly formed on the flats 12, for example by in situ laser deposition, welding, screen printing or other techniques.

In all cases, in order to ensure that the sensorized system 4 operates correctly, the flats 12 (FIG. 4) are preferably configured, according to an aspect of the invention, so that each delimits a respective surface 19 which is flat or planar and is positioned perpendicularly to the axis of symmetry A of the radially outer lateral cylindrical surface 13 of the outer ring 5.

Essentially, the flats 12 are positioned along chords of a circumference corresponding to the cross section of the radially outer lateral cylindrical surface 13, these chords being orientated perpendicularly to a radius of this circumference intercepting them.

The flats 12 are spaced from each other circumferentially, preferably at constant intervals, for example so as to be positioned at 90° to each other.

The radially outer ring 5 of the wheel hub unit is preferably coupled integrally to the suspension upright or knuckle 3; in particular, it is interference fitted in a first transverse hole 20 (FIG. 3) of the suspension upright or knuckle 3, formed perpendicularly to a first face 21 and a second face 22, opposite each other, of the suspension upright or knuckle 3, facing in use, respectively, towards the outside and towards the inside of the vehicle, so that the second face 22 is facing from the side opposite to the first end 7 of the outer ring 5.

According to this preferred configuration, a sensorized system 4 comprises, in combination with what has been described, at least one pin 23 (FIG. 3) fitted projectingly within a second hole 24 of the suspension upright or knuckle 3, on the side of the second face 22 and radially outside, and to the side of, the first hole 20.

The sensorized system 4 further comprises a seat 25 formed in an axially penetrating way through a flanged rim 26 (FIG. 4) of a second end 27 of the outer ring 5, opposite the first end 7 and interacting by bearing against the second face 22 of the suspension upright or knuckle 3.

The axially penetrating seat 25 of the flanged rim 26 consists of a radial recess or notch in the rim 26, and defines a circular seat, open radially towards the outside of the flanged rim 26.

According to an aspect of the invention, the pin 23 engages with the seat 25 to make the outer ring 5 of the wheel hub unit 2 angularly integral with the suspension upright or knuckle 3, so as to ensure that the sensors 15 correctly measure the deformations caused to the plane surface 19 of each flat 12 by the operating stresses to which the tire 160 and the corresponding wheel 17 are subjected.

In particular, the seat 25, consisting of a radial notch or recess in the rim 26, only partially engages with the pin 23, which is a cylindrical pin.

To ensure the correct operation of the pin 23, the seat 25 engages it on a circumferential portion of the pin 23 which is greater than half of the circumference of the pin 23.

The radially outer lateral cylindrical surface 13 of the outer ring 5 is, according to another aspect of the invention, also provided with an annular groove 28 (FIGS. 4-6) which intercepts all four of the flats 12 and which is delimited by a bottom wall 29 formed substantially flush with the flats 12, and particularly flush with the plane surfaces 19 delimited by the flats.

Figure 2:
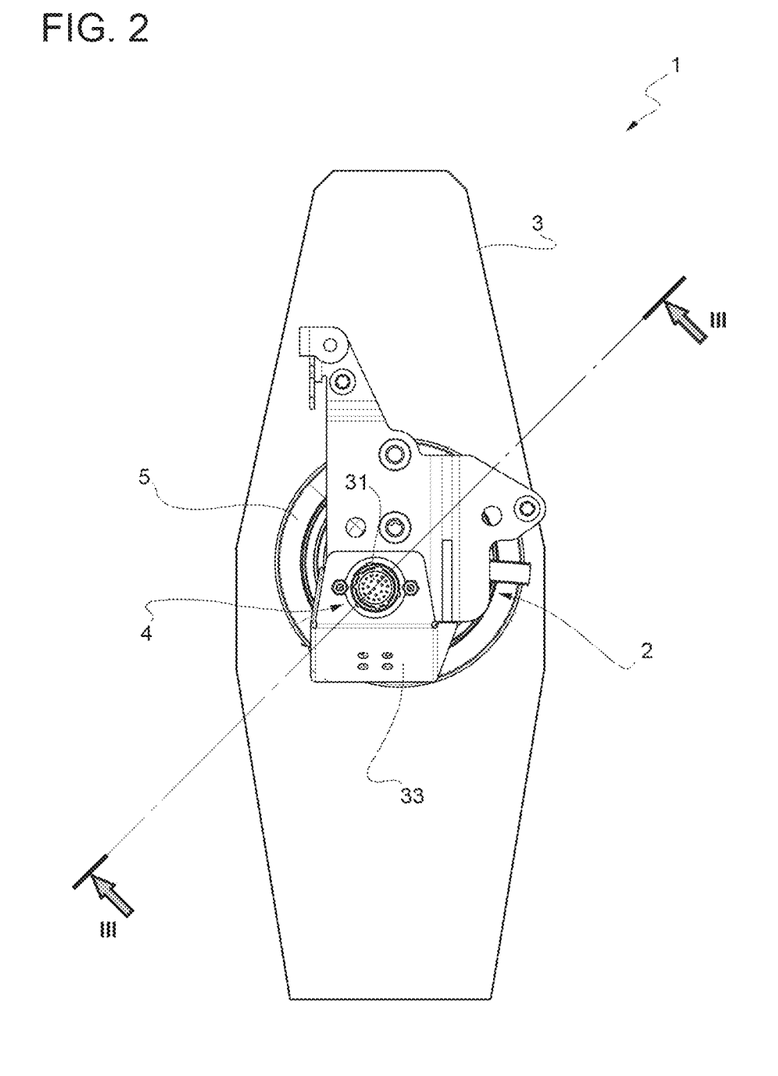

According to an aspect of the invention, the electrical circuit 16 consists of an electrically insulated conductive strip 30 (FIG. 6) housed within the annular groove 28, substantially flush with the same and in contact with the bottom wall 29, so as to pass in contact over each sensing module 14, and configured to connect electrically, in parallel, the sensor modules 14 to a data socket 31 (FIGS. 1-3) fixed integrally to the face 22 of the suspension upright or knuckle 3 facing from the side opposite to the first end 7 of the outer ring 5.

The conductive strip 30 is wound in a ring on the outer ring 5, inside the groove 28, and at the point where the conductive strip 30 is closed on to itself to form a ring it is bent at an angle, particularly a right angle, preferably at a circumferential position between two immediately adjacent flats 12 (according to the spacing or angular interval defined initially), or actually at the position of any of the flats 12.

More specifically, the conductive strip 30 is bent at an angle towards the flanged rim 26 of the second end 27 of the outer ring 5, which interacts by bearing against the second face 22 of the suspension upright or knuckle 3, so as to extend away from the groove 28.

The conductive strip 30 passes axially through the flanged rim 26 via an axial groove 32 formed radially through the flanged rim 26, and is connected electrically to the data socket 31. The data socket is carried integrally by the face 22 by means of a bracket 33 (FIGS. 2 and 3) fixed to the suspension upright or knuckle 3 by screws or other equivalent connecting members.

As described above, it is important for the flats 12 to be formed so that each delimits a plane surface 19 positioned perpendicularly to a perpendicular to the axis A of symmetry of the radially outer lateral cylindrical surface 13 of the outer ring 5.

Additionally, according to a further aspect of the invention, the pin 23 and the seat 25 are configured not only to make the outer ring 5 angularly integral with the suspension upright or knuckle 3, but also, and especially, to act as an angular reference for the angular positioning of the outer ring 5 in such a way that the flats 12 are positioned in opposing and alternating pairs which are horizontal and vertical respectively.

Finally, it is evident from the above description that the invention also relates to a sensorized system 4 in itself, configured for detecting in real time forces and moments applied to a tire 160 of a vehicle wheel 17 mounted on a wheel hub unit 2 comprising a radially outer ring 5 carried integrally in a stationary position by a vehicle suspension upright or knuckle 3, a flanged hub 6 configured to angularly support the vehicle wheel 17 in an integral manner and housed within the outer ring 5 of the wheel hub unit 2, and a plurality of rolling bodies 9 interposed between the flanged hub 6 and the outer ring 5 and engaging a pair of annular rolling tracks 10 formed on a radially inner lateral surface 11 of the outer ring 5.

The sensorized system 4 comprises, according to an aspect of the invention:

a radially outer cylindrical surface 13 of the outer ring 5 of the wheel hub unit 2, configured for coupling into a first transverse hole 20 in the suspension upright or knuckle 3;

at least four circumferential flats 12 formed to be angularly spaced from each other on the radially outer lateral cylindrical surface 13 of the outer ring 5, each flat delimiting a flat surface 19 which axially extends over both of the tracks 10 of said pair of annular tracks for the rolling bodies 9 and transversely to an axis of symmetry A of the radially outer lateral cylindrical surface 13 of the outer ring 5;

four strain sensor modules 14, each fixed integrally on a respective flat 12, each sensor module including a pair of strain sensors 15 positioned parallel to each other and each at the position of a respective annular rolling track 10, orientated in a circumferential direction, so as to extend along a circumferential development of the annular track 10; and an electrical circuit 16 for picking up a signal emitted by, or relating to, each sensor module 14.

The sensorized system 4 described above further comprises, according to the invention, a second hole 24 formed in the suspension upright or knuckle 3 radially on the outside of, and to the side of, the first hole 20 housing the outer ring of the wheel hub unit 5; a pin 23 fitted projectingly into the second hole 24; and a radial seat 25 of a flanged rim 26 of the outer ring 5 engaged by the pin 23, the flanged rim 26 interacting by bearing against the suspension upright or knuckle 3.

From the above description it is evident that the invention also relates to the wheel hub unit 2 as described and to a method for detecting the wheel stresses which uses an existing wheel hub unit 2, including a standard rolling bearing 34, which in turn includes the outer ring 5 and a radially inner ring 35 (FIG. 3), the bearing 34 being integrated with a commercially available suspension upright or knuckle 3 to which minimal modifications are made, while four pairs of strain sensors or extensometers 15 (two for each flat 12) may be integrated on the outer ring 5 at 90° to each other in a special area (at the position of the tracks 10) formed on the outer diameter of the outer ring 5 with a certain radial depth, not necessarily identical for all the flats 12 (since the choice of this depth at the design stage is based on the temper hardening profile of the tracks 10 and on the optimization of the signals of the extensometer 15), and a certain size in plan view, based on the size of the extensometer 15 used and on the performance of the suspension upright or knuckle 3.

Each extensometer 15 is preferably glued with a glue (or alternative adhesive material) capable of ensuring the contact, positioning and operation of the sensors 15 throughout the service life of the wheel hub unit 2. Each extensometer 15 will have fixed standard dimensions and will be positioned on the outer ring 5 in a specific position, each on a plane surface 19 exactly above one of the two tracks 10, this position having proved to be the best one for maximizing the load measurement, since it has been found to correspond to the area of projection of the bearing contact angle with respect to the extensometers 15 or to the gluing surface 19.

Each extensometer 15 is connected by soldering to a flexible printed circuit formed by the conductive strip 30 which is placed on the annular groove 28 over 360° on the outside diameter of the outer ring 5.

The flexible printed circuit 30 then emerges from the outer ring 5 on the inboard side through the axial groove 32, and, in order to provide an anti-rotation function, which has been found to be essential for correct operation, after the bearing 34 has been mounted on the suspension upright or knuckle 3 the special hole 24 is made through the suspension upright or knuckle 3 at the position of the special seat 20 for the outer ring 5. A pin 23 is then inserted through the hole 24 and the respective radially outer radial seat 25 to prevent any relative rotation. The anti-rotation function is necessary to avoid any risk of movement of the extensometers 15 with respect to the direction of the load.

Each pair of extensometers 15 is to be mounted initially on the special seat formed by the plane surfaces 19 of the flats 12, and correctly wired. After wiring, the whole cable is to be protected and fixed on the contact surfaces of the outer ring 5 by means of any known insulating coating, not shown for simplicity, which is necessary to avoid any movement during the mounting of the wheel hub unit 2 within the housing seat defined by the hole 20.

The assembly of the wheel hub unit 2 with the suspension upright or knuckle 3 is carried out as follows.

Firstly, the rolling bearing 34 is orientated, with the extensometers 15 already fitted, in a specific angular position to provide a pair of extensometers 15 aligned with the vertical direction in the seat 20 to detect the best output data; the mounting is to be carried out carefully to avoid damaging and/or cutting the conductive strip 30 or cable that emerges from the flanged rim 26.

Thus the extensometers 15 and at least a part of the electrical circuit defined by the conductive strip or flexible printed circuit 30 are also housed, in use, in the seat 20, and therefore in a protected position in which they can receive the optimal stresses.

Figure 3:
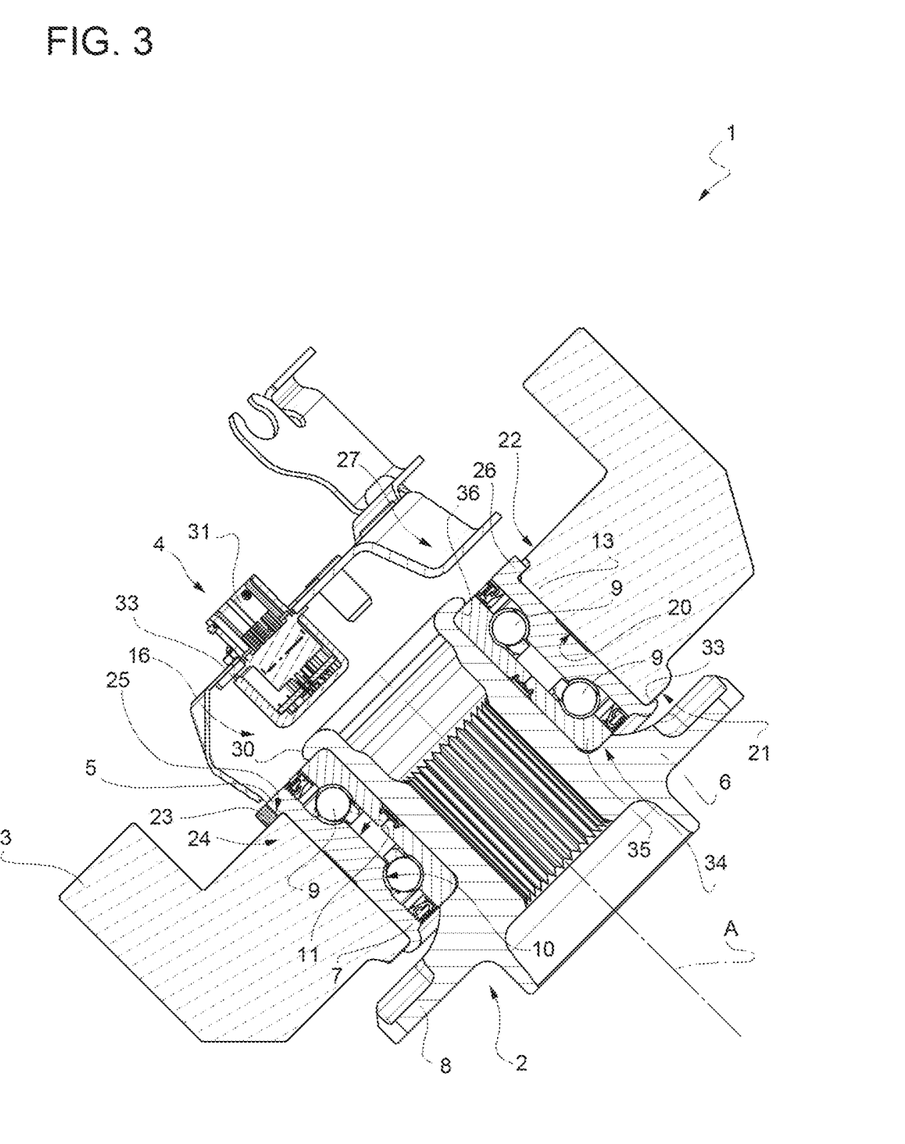
FIG. 3 shows schematically, on an enlarged scale, a sectional view taken along a plane III-III of the sensorized suspension assembly of FIG. 1.

When the rolling bearing 34 has been mounted on the inboard side of the suspension upright or knuckle 3 by forced fitting into the seat 20, the outer ring 5 is locked axially against the suspension upright or knuckle 3 on the outboard side by a first orbital forming operation, creating a shoulder rim 33 (FIG. 3). Finally, the flanged hub 6 is inserted into the outer ring 5 and inside the inner ring 35 through the outboard side (from the side of the face 21) and is assembled integrally with the inner ring 35 by means of a second orbital forming operation creating a shoulder rim 36 (FIG. 3), care being taken not to damage the flexible strip or cable 30 emerging from the outer ring 5.

The object of the present invention is to provide a sensorized system, a wheel hub unit and a suspension assembly for vehicles including such a sensorized system for detecting in real time the forces and moments applied to a tire of a wheel mounted on the wheel hub unit of the suspension assembly, this sensorized system being free of the drawbacks of the prior art while being reliable, economical, and simple to implement in existing wheel hub units.

According to the invention, therefore, a suspension assembly for vehicles is provided, including a suspension upright or knuckle and a wheel hub unit, and a wheel hub unit and a sensorized system associated with each other, having the characteristics stated in the attached claims.

From the above description, the advantages of the proposed solution will be easily appreciated upon reading this disclosure in its entirety, namely:

improvement of the performance of the vehicle;

the vehicle is provided with information about loads which is not available by direct measurement at the present time;

improvement of the reliability of the ESP software and the performance of the vehicle;

autonomous driving;

monitoring of the performance of the bearings.

All the objects of the invention are therefore achieved.

The invention claimed is:

1. A vehicle suspension group, comprising a wheel hub unit, a suspension upright for the wheel hub unit, and a sensorized system for detecting mechanical stresses acting on the wheel hub unit; the wheel hub unit comprising:
a radially outer ring stationary in use,
a flanged hub arranged coaxial and radially on an inside of the radially outer ring and facing, when in use, an outside of a vehicle, and
a plurality of rolling bodies inserted within the outer ring to render the flanged hub rotatable with respect to the outer ring,
wherein the sensorized system comprises,
four flats arranged angularly and spaced from one another on a radially outer lateral cylindrical surface of the outer ring, each flat extending axially over at least one pair of annular rolling tracks for the rolling bodies made on a radially inner lateral surface of the outer ring and orientated in a circumferential direction transverse to an axis of symmetry (A) of a radially outer lateral cylindrical surface of the outer ring;
a deformation sensing module fixed integrally on each flat, each sensing module including at least a pair of deformation sensor arranged at a respective annular rolling track for the rolling bodies and orientated according to a circumferential direction, so as to extend along a circumferential profile of the annular rolling track; and
an electric circuit to pick up a signal related to each sensing module in order to detect, in use and in real-time, forces and torques applied on a tire of a wheel mounted on the wheel hub unit,
wherein,
the pair of annular rolling tracks are arranged axially in tandem, and
the pair of deformation sensors are arranged parallel to one another, fixed on respective portions of each of the four flats, and arranged in an axial position substantially identical to that of the pair of annular rolling tracks.

2. The vehicle suspension group of claim 1, wherein the radially outer ring is fitted by interference in a first transverse hole of the suspension upright and arranged perpendicular to a first face and to a second face of the suspension upright, wherein the first face faces towards the outside of the vehicle when in use and the second face faces towards an inside of the vehicle when in use.

3. The vehicle suspension group of claim 2, wherein the sensorized system further comprises:
at least one pin disposed in a cantilever fashion within a second hole of the suspension upright, the second hole arranged on a side of the suspension upright radially outside the first transverse hole and on a same axial side of the second face; and
a seat formed on a flanged rim of a second end of the outer ring axially opposite the first end, the seat abutting the second face of the suspension upright, wherein the pin engages the seat for rendering the outer ring angularly integral with the suspension upright.

4. A wheel hub unit for a vehicle suspension group comprising a sensorized system for detecting the mechanical stresses acting on the wheel hub unit and a suspension upright, the wheel hub unit configured to couple with the suspension upright of the vehicle suspension group, the wheel hub unit comprising:
a rolling bearing comprising a stationary radially outer ring, a flanged hub disposed coaxial and radially on an inside of the radially outer ring and facing, when in use, towards an outside of the vehicle, and a plurality of rolling bodies inserted within the outer ring for rendering the flanged hub rotatable with respect to the outer ring,
wherein the sensorized system comprises:
four flats arranged angularly and spaced from each other on a radially outer lateral cylindrical surface of the outer ring, each flat extending axially over at least one annular rolling track for the rolling bodies made on a radially inner lateral surface of the outer ring and orientated in a circumferential direction transverse to an axis of symmetry (A) of the radially outer lateral cylindrical surface of the outer ring;

a deformation sensing module fixed integrally on each flat, each sensing module including at least one deformation sensor arranged at a respective annular rolling track for the rolling bodies and orientated circumferentially so as to extend along a circumferential profile of the annular rolling track;

at least one circular seat axially passing through a flanged rim of a second end of the outer ring and arranged axially opposite a first end of the outer ring, the at least one seat configured to abut, when in use, against the suspension upright; and an electric circuit for picking up a signal related to each sensing module, wherein a position of each deformation sensor corresponds to a position of a respective portion of a flat surface delimited by each flat, on which portions of the deformation sensors are fixed integrally, the portions of the flat surface arranged at a crossing of a line angle of each of the at least one annular rolling tracks with respect to the flat surface delimited by each flat, and wherein, the seat is configured to receive, when in use, a cylindrical pin inserted in a cantilever fashion in the suspension upright to render the outer ring angularly integral with the suspension upright, and the seat, when in use, is configured to at least partially engage a circumferential portion of the pin along at least half of the circumference of the pin.

5. The wheel hub unit of claim 4, wherein the radially outer lateral cylindrical surface of the outer ring is provided with an annular groove that intercepts the four flats and is delimited by a bottom wall obtained substantially flush with the flats, and wherein the electric circuit comprises an electrically insulated conductive strip housed within the annular groove and substantially flush with the annular groove so as to pass over and contact each sensing module, the conductive strip configured to connect, in parallel, the sensing modules with a data socket configured to be fixed, when in use, integrally with the suspension upright.

6. The wheel hub unit of claim 5, wherein the conductive strip is folded at an angle towards the flanged rim of the second end of the outer ring, the conductive strip passing through the flanged rim at an axial groove of the flanged rim made radially through the flanged rim.

7. The wheel hub unit of claim 6, wherein the conductive strip is folded between two of the flats.

8. The wheel hub unit of claim 6, wherein the conductive strip is folded at one of the flats.

9. The wheel hub unit of claim 6, wherein each of the four flats delimits at least one flat surface, the at least one flat surface arranged perpendicular to the axis of symmetry (A), and wherein the flats are circumferentially spaced from each other with a constant pitch.

10. The hub bearing unit of claim 1, wherein the radially outer lateral cylindrical surface of the outer ring comprises an annular groove that intercepts each of the four flats and that is delimited by a bottom wall that is substantially flush with the flats and wherein the electric circuit comprises an electrically insulated conductive strip housed within the annular groove and substantially flush with the annular groove so as to pass over and contact each sensing module, the conductive strip configured to connect, in parallel, the sensing modules with a data socket configured to be fixed, when in use, integrally with the suspension upright.

11. The wheel hub unit of claim 10, wherein the conductive strip is folded at an angle towards the flanged rim of the second end of the outer ring, the conductive strip passing through the flanged rim at an axial groove of the flanged rim made radially through the flanged rim, electrically connecting with the data socket.

12. The wheel hub unit of claim 11, wherein the conductive strip is folded between two of the flats.

13. The wheel hub unit of claim 11, wherein the conductive strip is folded at one of the flats.

14. The wheel hub unit of claim 11, wherein each of the four flats delimits at least one flat surface, the at least one flat surface arranged perpendicular to the axis of symmetry (A), and wherein the flats are circumferentially spaced from each other with a constant pitch.

15. A sensorized system for real time detection of forces and moments applied on a tire of a vehicle wheel mounted on a wheel hub unit comprising a radially outer ring carried integrally and in a stationary position by a vehicle suspension upright, a flanged hub configured to angularly and integrally support the vehicle wheel and housed within the outer ring, and a plurality of rolling bodies interposed between the flanged hub and the outer ring and engaged with a pair of annular rolling tracks made on a radially inner lateral surface of the outer ring, wherein the sensorized system comprises:

a radially outer cylindrical surface of the outer ring configured to couple inside a first transverse hole of the suspension upright;

at least four circumferential flats arranged angularly spaced from each other on the radially outer lateral cylindrical surface of the outer ring, each flat delimiting a flat surface which extends axially over both of the tracks of the pair of annular rolling tracks and transverse to an axis of symmetry (A) of the radially outer lateral cylindrical surface of the outer ring;

four deformation sensing modules each fixed integrally on a respective flat of the flour flats, each sensing module comprising a pair of deformation sensors arranged parallel to one another at a respective annular rolling track of the pair of annular rolling tracks, each sensing module orientated according to a circumferential direction, so as to extend along a circumferential profile of the pair of annular rolling tracks;

an electric circuit for picking up a signal associated with each sensing module;

a second hole made in the suspension upright arranged on a side of the suspension upright radially outside the first transverse hole and on an axially inner side of the wheel hub unit, and a pin inserted in a cantilever fashion in the second hole and a radial seat of a flanged rim of the outer ring, the flanged rim abutting against the suspension upright.

16. A method for detecting wheel stresses, the method comprising:

providing a wheel hub unit, the wheel hub unit comprising a flanged hub inserted in a rolling bearing, the rolling bearing comprising a radially outer ring, a radially inner ring and a plurality of rolling bodies interposed between the inner ring and the outer ring and engaging a pair of annular rolling tracks made on a radially inner lateral surface of the outer ring;

providing a suspension upright;

providing at least one deformation sensor coupled integrally on a radially outer lateral surface of the outer ring;

providing an electric circuit for picking up a signal associated with the at least one deformation sensor; and coupling the wheel hub unit to the suspension upright, wherein coupling the wheel hub unit to the suspension upright further comprises:

configuring a radially outer cylindrical surface of the outer ring to couple within a first transversal hole of the suspension upright;

arranging at least four circumferential flats, the flats angularly spaced from each other on the radially outer lateral cylindrical surface of the outer ring, each flat delimiting a flat surface that extends axially over both of the tracks of the pair of annular rolling tracks for the rolling bodies and transversely to an axis of symmetry (A) of the radially outer lateral cylindrical surface of the outer ring;

fixing four deformation sensing modules, each integral on a respective flat of the four flats, each sensing module including a pair of deformation sensors arranged parallel to each other at a respective annular rolling track and orientated circumferentially so as to extend along a circumferential profile of the annular rolling track;

connecting each of the four sensing modules to the electric circuit;

coupling the rolling bearing to the suspension upright by force fitting the outer ring into the first hole;

making a second hole in the suspension upright on a side axially opposite the first hole;

inserting a pin in a cantilever fashion in the second hole to couple the pin to a radial seat of a flanged rim of the outer ring and make the flanged rim abut the suspension upright; and inserting the flanged hub within the outer ring of the rolling bearing and coupling the flanged hub to the inner ring.

\* \* \* \* \*